April 30, 1968  C. LENZ  3,380,373

STRAINING VAT

Filed Jan. 21, 1966

INVENTOR

Conrad Lenz

By: *Low and Berman*

Agents 3,380,373
STRAINING VAT
Conrad Lenz, Annenhofstrasse 2, Freising, Germany
Filed Jan. 21, 1966, Ser. No. 522,161
Claims priority, application Germany, Mar. 10, 1965,
L 50,170
14 Claims. (Cl. 99—278)

ABSTRACT OF THE DISCLOSURE

An upright cylindrical vat for straining wort from spent grains having a perforated false bottom, vertical cutter blades suspended from a coaxially rotatable and axially movable carrier for breaking the cake of spent grains on the bottom, and a scraper attached to the lower cutter ends for separating the cake from the bottom. A plow for discharging the cake is vertically movable in slots of the blades and moves upwardly relative to the carrier when the latter is raised.

---

This invention relates to brewery equipment, and particularly to a straining vat for separating wort from spent grains.

It is customary to separate the wort from the spent grains in an upright cylindrical vat having a perforated bottom. After the mashing operation, a "cake of spent grains" (solid extracted mash ingredients) is formed at the bottom of the vat and serves as a filter or straining medium for the wort while the same is being drained off. The permeability of the spent grain material decreases during the draining-off operation so that it is necessary to break the cake by means of cutting blades mounted on a carrier and moving in circular paths about the axis of the vat. Means are provided for raising and lowering the carrier in such a manner that the lower ends of the cutting blades are kept at all times at a safe distance from the perforated bottom. The bottom layer of the cake nearest the perforated bottom usually has the lowest permeability, but is not touched by the cutting blades of the known apparatus, and undesirably affects the draining of the wort.

An important object of the invention is accordingly the convenient breaking up of the bottom layer of the aforedescribed cake.

The cake of spent grains is conventionally removed from the vat, after draining of the wort, through a normally closed aperture in the bottom by means of a plow attached to the cutting mechanism. This plow is capable of vertical movement, and is held out of the cake during the straining operation. For removing the spent grains, the plow is released from a lock and enters the cake under its own weight while moving about the vat axis. When the plow reaches the bottom of the vat and the spent grains have been removed, a workman must enter the vat so as to control the mechanism of the spent-grains remover.

Another object of the invention is the provision of a straining vat of the type described in which the plow may be raised mechanically without the need for human labor.

With these and other objects in view, the invention, in its more specific aspects provides a straining vat of the type described above with a horizontally elongated scraper which is interposed between the lower ends of the cutting blades and the perforated bottom, and with motion transmitting means connecting the scraper with the carrier of the cutting blades for sweeping movement of the scraper over the vat bottom when the carrier rotates about the axis of the vat. A plow is secured to the carrier for joint rotation about the vat axis and for axial movement relative to the carrier. A lifting device responsive to a predetermined axially upward movement of the carrier causes the plow to be lifted from the vat bottom to a position in which it can be engaged by a detent arrangement on the carrier.

Other features, and many of the attendant advantages of the invention will be readily appreciated as the same becomes better understood from the following detailed description of a preferred embodiment when considered with the attached drawing in which.

Figure 1:
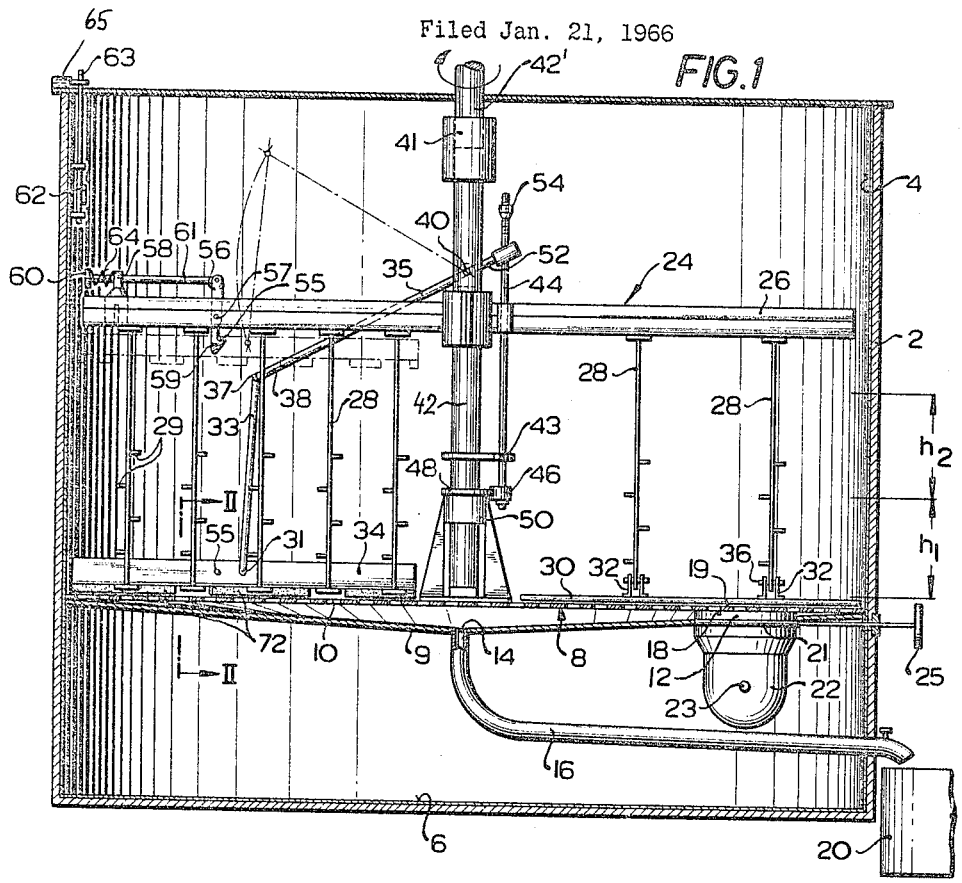
FIG. 1 shows a straining vat of the invention in front elevational section on its axis.

Referring now to the drawing in detail, and initially to FIG. 1, there is shown an upright cylindrical metal tank 2 whose side wall 4 and bottom wall 6 are covered with thermal insulation. A false bottom 8 in the tank 2 consists of conformingly engaged perforated segments 10, as is customary, and not shown in detail. A coaxial conically dished partition 9 under the bottom 8 slopes toward a central aperture 14 from which a discharge pipe 16 leads outward of the tank 2 to a wort vat 20.

Aligned openings 18 in the perforated bottom 8 and the partition 9 are normally closed by a plug 12 which has a perforated plate portion 19 and an imperforate portion 21 respectively sealing the two apertures 18. A footstep bearing 50 on the perforated bottom 8 receives the lower end of a drive shaft 42 whose upper end is connected by a coupling 41 to a motor for rotation in the direction of the arrow, only the output shaft 42' of the motor being shown. The motor and drive shaft 42 are mounted on a non-illustrated support which may be raised and lowered in the direction of the drive shaft axis by a motor driven worm gear transmission (not shown) in a known manner.

A trough 22 under the openings 18 is equipped with a conveyor screw, of which only the shaft 23 is visible in the drawing, for discharging broken cake from the vat. The plug 12 may be opened and closed by a handle 25 outside the tank 2. A non-illustrated vacuum pump is connected to the trough 22.

The cutting mechanism 24 includes a carrier bar 26 which is fixedly fastened to the shaft 42. The carrier bar 26 extends across the width of the tank 2 along a diameter, and its two longitudinal portions on opposite sides of the shaft 42 carry fixedly attached cutter blades 28. The blades depend from the bar 26 in radially spaced relationship. Their vertical cutting edges face in the direction of their movement. Horizontal auxiliary blades 29 are attached to the blades 28 at various levels.

Figure 2:
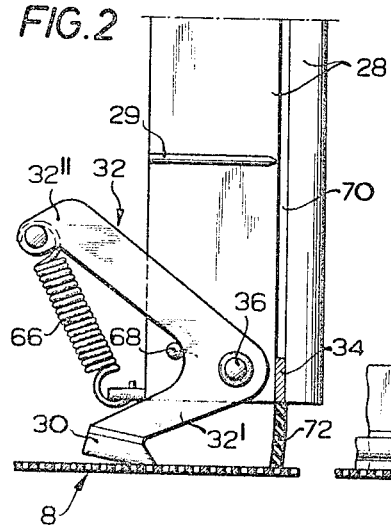
FIG. 2 shows a detail of the vat of FIG. 1 in enlarged side-elevational section on the line II—II.
Figure 3:
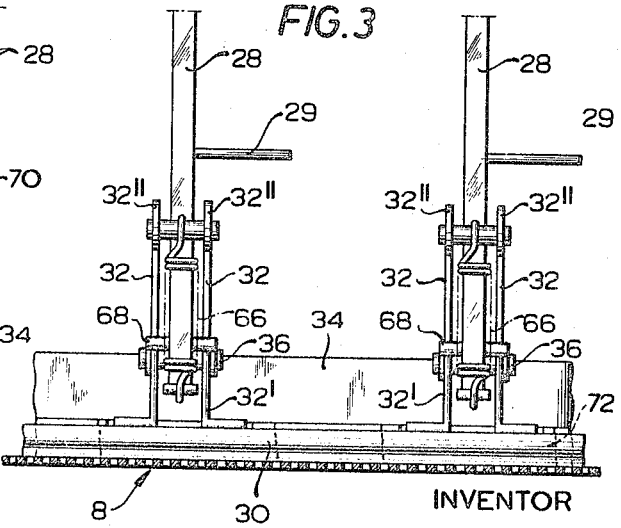
FIG. 3 shows another detail of FIG. 1 on the scale of FIG. 2.

As is better seen in FIGS. 2 and 3, a pair of bell crank levers 32 is attached to the lower end of each cutting blade 28 by a pivot pin 36 which passes through the blade and whose free ends respectively carry the levers. A helical tension spring 66 arranged between the two levers 32 of each pair is attached to respective arms 32" of the levers and the bottom end of the associated cutting blade 28 to bias the levers for counterclockwise movement as viewed in FIG. 2. This movement is limited by a stop pin 68 on the blade 28 normally engaging the arm 32". The other arms 32' of the levers 32 are fixedly attached to a horizontally elongated scraper blade 30 whose edge tapers at an acute angle, and is urged toward the perforated bottom 8 by the springs 66 as far as permitted by the stop pins 68 which prevent injury to the plate 8 by the scraper edge. A scraper blade 30 is associated with the group of cutting blades 28 depending from each longitudinal portion of the carrier bar 26.

The several cutting blades 28 on one of the afore-mentioned portions of the carrier bar 26 are vertically slotted in a common plane, and a rigid plate-shaped plow 34 is slidably received in the guide slots 70 of the cutting blades 28. Several heavy rubber aprons 72 horizontally spaced over the length of the plow 34 depend from the same into engagement with the bottom 8 in the lowermost position of the plow 34 illustrated in FIGS. 2 and 3, and shown in FIG. 1 in fully drawn lines.

The plow 34 may be lifted toward the position indicated by broken lines in FIG. 1 by means of a lifting linkage 38 which includes a link 33 pivotally attached to the plow 34 by a pin 31, and hingedly connected to another link 35 by a pin 37. The link 35 is a two-armed lever which is mounted on the carrier bar 26 and the shaft 42 by a pivot 40. An abutment 54 is adjustably mounted on a vertical rod 44 in the path of the free arm 52 of the rod 35 when the carrier 26 is raised from the illustrated position with the drive shaft 42. The rod 44 slidably passes through bores in the arm 52 and the carrier bar 26, and is guided by an apertured bracket 43 on the shaft 42, so that the rod 44 rotates with the shaft 42 and the carrier 26. A fork 46 on the bottom end of the rod 44 slidably engages the edge of a fixed flange 48 on the bearing 50 so as to prevent axial movement of the rod.

When the carrier bar 26 is raised from the illustrated position, the arm 52 strikes the abutment 54 on the rod 44, whereby the linkage 38 is pivoted, and the plow 34 is lifted to its upper or inoperative position. It is held in that position by a detent mechanism, even if the bar 26 is again lowered, as indicated in chain-dotted lines.

The detent mechanism includes a rocker 56 mounted on the carrier bar 26 by a pivot pin 57 in a normally vertical position. The lower arm 59 of the rocker 56 is hook-shaped for engagement with a latch pin 55 on the plow 34. A bar horizontally slidable on the carrier bar 26 in a bearing 58 is pivoted to the upper arm of the rocker 56, and a helical compression spring 64 interposed on the rod 61 between the bearing 58 and a plate 60 on the free end of the rod 61 holds the hook-shaped end 59 in the illustrated position.

A cam 62 is mounted on the side wall 4 by means of a rotatable support rod 63, and may be horizontally aligned with the plate 60 when the cutting mechanism is lifted from the illustrated position. The support rod 63 carries a handle 65.

The apparatus illustrated is operated as follows:

A mixture of spent grains and wort is continuously fed to the tank 2 in a manner not further illustrated, until a filter cake of spent grains is built up to a height $h_1$, typically 30–40 cm. A column of wort extending to a level $h_2$ of 80 to 90 cm. percolates through the cake into the vat 20. When the rate of liquid flow from the discharge pipe 16 becomes unsatisfactory, the cutting blades 28 are gradually lowered into the filter cake while they are rotated by the drive shaft 42. The residual wort is thus caused to pass to the vat 20. Ultimately, the scraper blades 30 which sweep over the bottom 8 remove the bottom layer of the filter cake under the combined forces of gravity and of the springs 66 which urge the sharp edges of the scrapers 30 into the cake and toward the bottom 8. When the arms 32" abut against the pins 68, the cake has been practically cut loose from the bottom 8.

The plow is held in the inoperative position by the rocker 56 during the breaking of the cake by the blades 28 and 30. When breaking is completed, the plug 12 is opened by means of the handle 25, and the conveyor screw 23 and its associated vacuum pump (not shown) are started. The handle 65 is turned to move the cam 62 into its operative position, and the rotating cutting apparatus 24 is raised until the plate 60 moves circumferentially over the inclined face of the cam 62, whereby the rocker 56 is tilted to release the plow 34. The plow drops to its lower position, and sweeps the broken cake of spent grains into the trough 22 during the continuing rotation of the shaft 42. Injury to the perforated bottom 8 is prevented by the heavy, but still pliable rubber aprons 72 which substantially close the gap between the bottom 8 and the lower edge of the plow 34 in the lowermost position of the latter.

When the plowing is done, the cutting mechanism is raised until the arm 52 engages the abutment 54 while the cam 62 is swung away from the path of the plate 60. The link 35 is tilted on its pivot 40, and the plow 34 is lifted thereby until the latch pin 55 engages the obliquely inclined lower face of the rocker arm 59, thereby displacing the arm against the restraint of the spring 64. The pin 55 eventually clears the hook-shaped end of the rocker 56, and drops into a recess of the rocker. The cutting mechanism now is ready for the next cycle of straining operations.

While the invention has been described with particular reference to specific embodiments, it is to be understood that it is not limited thereto, but is to be construed broadly and restricted solely to the scope of the appended claims.

What is claimed is:

1. A straining vat for brewery use comprising, in combination:
    (a) a container having an upright axis and being of substantially circular cross section transversely of said axis, the container having a perforated bottom;
    (b) a carrier member elongated diametrically relative to said axis, said carrier member being upwardly spaced from said bottom;
    (c) actuating means for rotating said carrier member about said axis;
    (d) a plurality of horizontally spaced cutting blades suspended from said carrier and extending therefrom downwardly toward said bottom, the lower ends of said blades being spaced from said bottom;
    (e) a horizontally elongated scraper member interposed between said lower ends and said bottom; and
    (f) a plurality of motion transmitting means respectively connecting said scraper member to said lower ends for sweeping movement of the scraper member over said bottom when said carrier member is rotated about said axis.

2. A vat as set forth in claim 1, further comprising yieldable means biasing said scraper member toward abutting engagement with said bottom during said sweeping movement.

3. A vat as set forth in claim 2, further comprising abutment means for limiting movement of said scraper member toward said bottom.

4. A vat as set forth in claim 2, wherein said scraper member has a longitudinal edge portion and tapers toward said edge portion, said yieldable means urging said edge portion into scrapping engagement with said bottom.

5. A vat as set forth in claim 4, wherein said motion transmitting means include two lever members respectively pivoted on the lower ends of two of said cutting blades, said scraper member being attached to said lever members, and said yieldable means including spring means interposed between one of said lever members and the associated cutting blade.

6. A vat as set forth in claim 5, abutment means on one of said two cutting blades engageable with the associated lever member for limiting movement of said edge portion toward said bottom.

7. A straining vat for brewery use comprising, in combination:
    (a) a container having an upright axis and being of substantially circular cross section transversely of said axis, the container having a perforated bottom;
    (b) a carrier member elongated diametrically relative to said axis, said carrier member being upwardly spaced from said bottom;
    (c) actuating means for rotating said carrier member about said axis;
    (d) a plurality of spaced cutting blades suspended from said carrier and extending therefrom downward toward said bottom, the lower ends of said blades being spaced from said bottom;

(e) a horizontally elongated scraper member interposed between said lower ends and said bottom;

(f) motion transmitting means connecting said scraper member to said carrier member for sweeping movement of the scraper member over said bottom when said carrier member is rotated about said axis;

(g) a plow member;

(h) securing means securing said plow member to said carrier member for joint rotation about said axis and for axial movement relative to said carrier member toward and away from said bottom; and (i) releasable detent means for preventing movement of said plow member toward said bottom from a position remote from the same.

8. A vat as set forth in claim 7, wherein said actuating means include an upright shaft, said carrier member being secured to said shaft for rotation therewith and for axial movement toward and away from an operative position adjacent said bottom, said securing means including lifting means responsive to a predetermined axially upward movement of the carrier member for lifting said plow member from said bottom toward a position of engagement by said detent means.

9. A vat as set forth in claim 8, further comprising release means on said container and engageable with said detent means for releasing said plow member from said detent means in response to rotation of said carrier member while upwardly spaced from said operative position.

10. A vat as set forth in claim 8, wherein said lifting means include a linkage having a plurality of hingedly connected members, one of said linkage members being pivoted to said carrier member and another linkage member being attached to said plow member, and an abutment member connected to said carrier member for joint rotation about said axis and secured against axial movement relative to said container.

11. A vat as set forth in claim 7, said plow member being plate-shaped, said cutting blades being formed with respective guide slots extending in a common plane, said plow member being received in said slots for said axial movement thereof.

12. A vat as set forth in claim 11, further comprising apron means of pliable material depending from said plow member and engaging said bottom in the lower one of said positions of the plow member.

13. A vat as set forth in claim 12, further comprising releasable detent means on said carrier member for holding said plow member in the upper one of said two positions thereof.

14. A vat as set forth in claim 13, wherein said actuating means include an upright shaft in said container, said carrier member being secured to said shaft for rotation therewith and for axial movement toward and away from said bottom, the vat further comprising lifting means responsive to a predetermined axially upward movement of said carrier member for lifting said plow member from said lower position to said upper position thereof, and releasing means movable on said container toward and away from an operative position in which said releasing means are adapted to engage said detent means during the rotation of the carrier member in response to upward axial movement of said carrier member.

References Cited

UNITED STATES PATENTS

| | | | |
|---|---|---|---|
| 1,958,301 | 5/1934 | Greene | 259—108 X |
| 2,042,284 | 5/1936 | Westcott et al. | 99—278 |
| 2,517,149 | 8/1950 | Walsh et al. | 259—108 X |
| 2,782,013 | 2/1957 | Dittrich | 259—108 |

ROBERT W. JENKINS, *Primary Examiner.*